(12) United States Patent
Reimann

(10) Patent No.: US 12,375,924 B2
(45) Date of Patent: Jul. 29, 2025

(54) METHOD FOR DETECTING THE TIME OF THE EARLIEST RECEPTION OF A SIGNAL CHANGE, IN PARTICULAR FOR MEASURING DELAY TIME OR FOR DEFENSE AGAINST RELAY ATTACKS

(71) Applicant: LAMBDA:4 ENTWICKLUNGEN GMBH, Hamburg (DE)

(72) Inventor: Rönne Reimann, Hamburg (DE)

(73) Assignee: Lambda:4 Entwicklungen GmbH, Hamburg (DE)

( * ) Notice: Subject to any disclaimer, the term of this patent is extended or adjusted under 35 U.S.C. 154(b) by 985 days.

(21) Appl. No.: 17/310,275

(22) PCT Filed: Jan. 24, 2020

(86) PCT No.: PCT/EP2020/051736
§ 371 (c)(1),
(2) Date: Oct. 1, 2021

(87) PCT Pub. No.: WO2020/156939
PCT Pub. Date: Aug. 6, 2020

(65) Prior Publication Data
US 2022/0104022 A1      Mar. 31, 2022

(30) Foreign Application Priority Data

Jan. 28, 2019   (EP) .................................... 19153918

(51) Int. Cl.
| | |
|---|---|
| H04W 12/122 | (2021.01) |
| H03M 1/12 | (2006.01) |
| H04L 7/033 | (2006.01) |
| H04W 12/08 | (2021.01) |
| H04W 12/63 | (2021.01) |

(52) U.S. Cl.
CPC ....... *H04W 12/122* (2021.01); *H03M 1/1245* (2013.01); *H04L 7/033* (2013.01); *H04W 12/08* (2013.01); *H04W 12/63* (2021.01)

(58) Field of Classification Search
CPC ..... H04L 12/10; H04L 5/0048; H04L 5/0007; H04L 7/033; G06F 1/26; H04J 3/06; H04B 5/0031; H04B 1/26; H04W 56/0015; H04W 12/122; H04W 12/08
See application file for complete search history.

(56) References Cited

U.S. PATENT DOCUMENTS

| | | | |
|---|---|---|---|
| 5,661,490 A | 8/1997 | McEwan | |
| 7,512,113 B2 | 3/2009 | Luaces | |
| 10,630,510 B2* | 4/2020 | Pratt | .................... H04L 25/0204 |
| 2010/0309957 A1* | 12/2010 | Chester | ................... H04B 1/707 375/E1.003 |
| 2022/0116168 A1* | 4/2022 | Lee | ....................... H04W 56/00 |

FOREIGN PATENT DOCUMENTS

EP      3098626      11/2016

OTHER PUBLICATIONS

Han Hong Gul et al. "A 1.9-mm-Precision 20-GHz Direct-Sampling Receiver Using Time-Extension Method for Indoor Localization" IEEE Journal of Solid-State Circuits, IEEE Service Center, Piscataway, NJ, USA, vol. 52, No. 6, Jun. 2017 (Jun. 2017), pp. 1509-1520, [retrieved on May 24, 2017] DOI: 10.I 109/JSSC.2017.2679068 ISSN: 0018-9200, XP011649813, figures 1,2,3,4,6,7,8,12, paragraph III.D, paragraph I, abstract, paragraph II.A-II.B Song Haixin et al. "A Secure TOF-Based Transceiver with Low Latency and sub-cm Ranging for Mobile Authentication Applications" 2018 IEEE Radio Frequency Integrated Circuits Symposium (RFIC), IEEE, Jun. 10, 2018 (Jun. 10, 2018), pp. 160-163 DOI: 10.I 109/RFIC.2018.8429022 XP033383086, figures 2-5, paragraph [OOOI] paragraph [II.A] paragraph [II.BJ].

Ranganathan Aanjhan et al. "Are We Really Close? Verifying Proximity in Wireless Systems" Security & Privacy, IEEE, vol. 15, No. 3, Jun. 2017 (Jun. 2017), pp. 52-58, [retrieved on Jun. 9, 2017] DOI: 10.1109/MSP.2017.56 ISSN: 1540-7993, XP011652630 pp. 56-57; figures 7,8.

Anonymous. "Dateni.ibertragung—Wikipedia" Dec. 4, 2018 (Dec. 4, 2018), Retrieved from the Internet: https://de.wikipedia.org/w/index.php?title=Dateni.ib ertragung&oldid=I 83392778 [retrieved on Jul. 2, 2020] XP055711367.

Anonymous. "Code—Wikipedia" Jan. 14, 2019 (Jan. 14, 2019), Retrieved from the Internet: https://de.wikipedia.org/w/index.php?title=Code&ol did=I 84719423 [retrieved on Jul. 2, 2020] XP055711369.

Gerhard P Hancke et al. "Attacks on time-of-flight distance bounding channels" WISEC'0S, ACM, Alexandria, Virginia, USA, Mar. 31, 2008 (Mar. 31, 2008), pp. 194-202DOI: 10.I 145/1352533. 1352566ISBN: 978-1-59593-814-5. XP058334477, paragraph [0002] paragraph [02.1] paragraph [02.2] figure 1.

Han Hong Gul et al: "A 1.9-mm-Precision 20-GHz Direct-Sampling Receiver Using Time-Extension Method for Indoor Localization" IEEE Journal of Solid-State Circuits, vol. 52, No. 6 , Jun. 2017 Service Center, Piscataway, NJ, USA.

Song Haixin et al: "A Secure TOF-Based Transceiver with Low Latency and sub-cm Ranging for Mobile Authentication Applications" Jun. 10, 2018 IEEE Radio Frequency Integrated Circuits Symposium.

(Continued)

*Primary Examiner* — Iqbal Zaidi
(74) *Attorney, Agent, or Firm* — Sand, Sebolt & Wernow Co., LPA

(57) ABSTRACT

The present invention relates to detecting the time of the earliest reception of a signal change. In particular, the method according to the invention allows early detection of the signal change, which significantly reduces the timespan available for an undetected relay attack and can thus prevent such an attack or at least make it significantly more difficult, without the data transmission systems that consist of the transmission technology, such as UMTS, LTE, or Bluetooth, having to be modified for this purpose or ultra-wideband signals being required. The object is achieved in that the earliest time at which there is a statistically significant signal change is selected as the time of the earliest reception, wherein the threshold of the statistical significance is determined from the signal itself.

19 Claims, 3 Drawing Sheets

(56) References Cited

OTHER PUBLICATIONS

Gerhard P Hancke et al: "Attacks on time-of-flight distance bounding channels" WISEC'08, ACM, Alexandria, Virginia, USA, Mar. 31, 2008 (Mar. 31, 2008), Seiten194-202, XP058334477, DOI: 10.1145/1352533.1352566.
Ranganathan Aanjhan et al: "Are We Really Close? Verifying Proximity in Wireless Systems", Security & Privacy, IEEE, Bd. 15, Nr. 3, Jun. 2017 (Jun. 2017), Seiten 52-58, XP011652630, ISSN: 1540-7993, DOI: 10.1109/MSP.2017.56.
Anonymous: "Datenubertragung—Wikipedia", Dec. 4, 2018 (Dec. 4, 2018), XP55711367, Gefunden im Internet: URL:https://de.wikipedia.org/w/index.php? ititle=Datenubertragung&oldid=183392778 [gefunden am Jul. 2, 2020].
Anonymous: "Code—Wikipedia", Jan. 14, 2019 (Jan. 14, 2019), XP55711369, Gefunden im Internet URL:https://de.wikipedia.org/w/index.php?title=Code&oldid=184719423[gefunden am Jul. 2, 2020].

\* cited by examiner

METHOD FOR DETECTING THE TIME OF THE EARLIEST RECEPTION OF A SIGNAL CHANGE, IN PARTICULAR FOR MEASURING DELAY TIME OR FOR DEFENSE AGAINST RELAY ATTACKS

TECHNICAL FIELD

The present invention relates to detecting the time of the earliest reception of a signal change.

BACKGROUND ART

One known approach is to sample the received pulses in smaller and more precise steps. To improve sampling of received impulses, for example, Han et al., "*A 1.9-mm-Precision 20-GHz Direct-Sampling Receiver Using Time-Extension Method for Indoor Localization*", IEEE Journal of Solid-State Circuits. June 2017, Vol. 52, No. 6, pages 1509-1520, DOI 10.1109/JSSC.201 7.2679068, proposes a new method, namely direct sampling with time delay, in which highly time-resolved sampling takes place during the short pulses and the analysis of these sampled pulses takes place between the pulses. Song et al., "*A Secure TOF-Based Transceiver with Low Latency and sub-cm Ranging for Mobile Authentication Applications*" IEEE Radio Frequency Integrated Circuits Symposium. June 2018, pages 160-163. DOI 10.1 109/RFIC.2018.8429022, also proposes improving authentication by means of a round-trip time of an impulse signal through binary phase shift-keying and pulse phase modulation of impulses that are received and to be resent.

Furthermore, digital transmission systems are known which code and transmit the information in symbols and/or chips, for example Bluetooth, UMTS, or LTE. Depending on the data to be transmitted, either (rarely) the same or (mostly) different symbols or chips are transmitted one after the other, so that a stream of symbols and/or chips to be transmitted results. The symbols and/or chips are respectively transmitted within symbol and/or chip periods. The transmission of a symbol or chip usually takes a predetermined period of time; the next symbol or the next chip can then be transmitted in the subsequent symbol or chip period. As a rule, however, the received signal only is used to decode the information encoded therein. To this end, methods for partial and/or non-precise time synchronization of the objects involved in the transmission are used, particularly transmitters and/or receivers, in particular so that the receiver detects, at least with a predetermined accuracy, the temporal component of the signal from which it should decode a first piece of information and from which it should the next, etc. Usually bidirectional connections are used in which both partners act as transmitter and receiver, at least to transmit control signals in both directions. For a solid transmission, it is important that the receiver detects the temporal component of the received signal from which it can decode a piece of information. A particularly precise time synchronization in the transmission system in relation to the symbol or chip period, however, is usually not aimed for and is not particularly advantageous in practice. However, shorter symbol or chip periods allow higher data transmission rates with an otherwise similar design of the system.

In the Bluetooth standard, a clock is used for this and the other communication partners work with an offset to this clock. For this purpose, each communication partner has its own clock that measures time (not synchronization) with an accuracy of about 3 µs. For example, the CSP mechanism is used for synchronization. CSP offers a synchronization accuracy of about 1 ms. In general, known transmission systems achieve time synchronization or signal propagation time measurement with an accuracy corresponding to the symbol rate up to a maximum of a quarter of the symbol rate.

Under real conditions, particularly with wireless transmission, multi-pathing effects occur, particularly with wireless transmission, which cause, inter alia, that different components of the beam signal arrive at the receiver at different points in time, particularly because they have traveled different paths between the transmitter and receiver. These components usually overlap again at the receiver. The signal component that arrives first is not necessarily the strongest component in relation to the power. Transmission systems therefore usually only use the center part of the symbol or chip period for decoding.

In existing systems, signal propagation times between the transmitter and receiver are measured, for example, to partially synchronize the clocks of the transmitters and receivers involved.

It is also known from pure distance measuring systems known, for example from EP 3 098 626 A1, to evaluate the signal round trip time of a signal pulse as the signal reaches the transmitter after reflection of the signal by starting a signal generator via a comparator when a predetermined signal amplitude is exceeded, which generates a repeated edge and deduces the point in time of arrival of the pulse based on sampling of the edge but based on the exceeding of a predetermined signal amplitude. It is also known to adapt the triggering of a threshold value circuit to the overall signal strength by means of normalization.

SUMMARY OF THE INVENTION

The object of the present invention is to enable a more precise determination of the earliest receipt of a signal change. This can be done, for example, to improve the propagation time measurement, in particular for distance measurement and/or synchronization, but also to detect and defend against relay attacks as well as to shorten the symbol or chip period or to increase the robustness of the transmission system. For this purpose, in particular, it is not intended that a predetermined and/or constant signal amplitude can be used.

The object of the present invention is also to provide a method for detection and/or defense against relay attacks, a use of a point in time of earliest reception of a signal change and/or a signal edge for access control, authentication, distance measurement, synchronization and/or for detection and/or to defend against relay attacks, as well as an access control system and a method for securing an access system.

In particular, the method according to the invention allows early detection of the signal change, which significantly reduces the timespan available for an undetected relay attack and can thus prevent such an attack or at least make it significantly more difficult, without having to change the transmission technology of existing data transmission systems, such as UMTS, LTE, or Bluetooth, or requiring ultra-wideband signals.

The accuracy of the method is particularly dependent on the quality of the transmission between transmitter and receiver. The method adapts itself, in particular, to the current transmission conditions and thus can particularly provide especially high accuracy both under poor transmission conditions as well as under good transmission conditions.

The object is achieved, inter alia, by means of a method for determining a point in time of the earliest reception of a signal change and/or a signal edge, in particular for measuring the propagation time, in particular for measuring distance and/or for synchronization, in a particularly symbol-synchronized and/or digital transmission system.

In this case, any transmission system or any transmission standard that fulfills the following requirements can be used; in particular, existing systems or standards can be used. In particular, as a rule, existing hardware can also be used and corresponding process guidance usually only has to be established in the software. This is usually possible without affecting the compatibility with a standard or other devices.

By means of the transmission system, at least one first plurality of symbols and/or chips is transmitted from a first to a second object, at a first symbol or chip rate, encoded in at least one first analog signal, and/or is transmitted from a first to a second object, in at least one second analog signal generated based on the first analog signal.

The first plurality of symbols and/or chips is arbitrary. All that matters is that the first signal has at least one edge, as is customary for coding 0 and 1, for example. The first signal can be, for example, a low-frequency signal, for example in the kilohertz or megahertz range, which is mixed with a carrier signal, for example, resulting in the second analog signal, which usually has a higher frequency range, for example in the gigahertz range. This second signal can be sent, for example, wirelessly and received by a receiver.

The ordinal numbers for more precise designation of the pluralities should not indicate a sequence, in particular no chronological order, but should only be used to differentiate among the various pluralities. Other arbitrary designations such as plurality A (instead of first plurality), plurality B (instead of second plurality, plurality C (instead of third plurality), etc. are also possible, for example.

In particular, the third plurality is less than or equal to the first plurality, and/or the third plurality of the transmitted symbols and/or chips is a subset of or equal to the first plurality of symbols and/or chips.

In particular, the fifth plurality is less than or equal to the first plurality, and/or the fifth plurality of the transmitted symbols and/or chips is a subset of or equal to the first plurality of symbols and/or chips.

In particular, the fifth plurality is equal to the third plurality, and/or the fifth plurality of the transmitted symbols and/or chips is equal to the third plurality of symbols and/or chips.

In known transmission systems, (relative) time measurements are usually adapted in the transmitter and receiver in order to clearly detect when the transmission of an information unit, for example a symbol and/or chip begins and/or ends and/or when a symbol and/or chip period begins and/or ends. The systems are therefore usually symbol-synchronized. Distance measurements can also be derived from this synchronization, but these do not come close to the possibilities of the analysis according to the invention. In this case, the period, i.e. the symbol and/or chip period, particularly represents the inverse of the rate, that is specifically the symbol period represents the inverse of the symbol rate and/or the chip period represents the inverse of the chip rate.

The symbols and/or chips can represent, transmit, and/or encode any information and/or usable data. Information, symbols, or chips independent from this method or to detect the earliest point in time, for example payload and/or, for improvement of the described method, information related to the signal or its edges may be transmitted.

The method can thus be used in conventional transmission systems and the data, symbols, chips, and signals that are being transmitted anyway can be used to carry out the analysis. A transmission of data solely for the analysis is not absolutely necessary but can be advantageous.

According to the invention, a second plurality of sampling values at the second object of a third plurality of the transmitted symbols and/or chips of the at least one first or second analog signal is used to detect the earliest reception of the signal change and/or the signal edge of a symbol or chip that has changed as compared to the preceding symbol or chip.

The second plurality can correspond in number to the first plurality; the same applies to the first and third and the second and third pluralities. In any case, the second plurality of sampling values does not require two groups of sampling values, because the ordinals used in front of the word "plurality" are only intended to enable the different pluralities to be clearly separated. In terms of numbers, each plurality has in particular at least the value three, in particular at least the value 10. The third plurality is generally less than the first plurality, because the third plurality of transmitted symbols and/or chips of the at least one first or second analog signal particularly represents a subset of the first plurality of symbols and/or chips.

According to the invention, the time point of the earliest reception is selected as the time point, particularly in the signal and/or chip period, at which the earliest of the second plurality of sampling values or the earliest aggregated group from the second plurality of sampling values lies, particularly in the signal and/or chip period, which plurality indicates a statistically significant change and/or which exceeds or falls below a value determined from a fourth plurality of sampling values of the first and/or second analog signal or which goes beyond a value range determined from a fourth plurality of sampling values of the first and/or second analog signal.

In particular, an aggregated value should be understood as a value formed through mathematical means, such as, e.g., by forming the arithmetic, geometric, or other mean or median from a number, plurality, and/or set of values, in particular sampling values.

An aggregated group of values, in particular sampling values, should be understood as particularly a number, a plurality, and/or set of values, in particular sampling values, which particularly follow one another in temporal sequence, in particular directly, and which are combined to form a group. An aggregated value can be formed from such an aggregated group through mathematical means, such as, e.g., by forming the arithmetic, geometric, or other mean or median from the number, plurality, and/or set of values, in particular sampling values.

The earliest aggregated group is, in particular, that which has a sampling value that was taken earlier, particularly when considered in the symbol and/or chip period, than the sampling values of the other aggregated groups. In particular, the aggregated groups are chosen so that the times at which their sampling values were taken do not overlap, and/or the earliest aggregated group is particularly that in which the sampling values thereof were taken earlier, particularly when considered in the symbol and/or chip period, than the sampling values of the other aggregated group in question.

In particular, the time point of the earliest reception is selected as the time point, particularly in the signal and/or chip period, at which the earliest of the second plurality of sampling values or the earliest aggregated group from the second plurality of sampling values lies, particularly in the signal and/or chip period, which indicates a statistically significant change as compared to the remainder of the sampling values of the second plurality of sampling values and/or within the first and/or second analog signal and/or which exceeds or falls below a value determined from a fourth plurality of sampling values of the first and/or second analog signal or which goes beyond a value range determined from a fourth plurality of sampling values of the first and/or second analog signal.

Thus, there is a check as to when or in which sampling value or in which aggregated group the first change in the received first or second analog signal is detected which fulfills at least one specific requirement, which in particular depends on the signal itself. The change is determined in particular by comparing the sampling value with an aggregated value, in particular a mean value, for example an arithmetic mean or median, from the fourth plurality of sampling values. The earliest point in time is an absolute point in time measured, for example, against a clock in the transmission system. As a rule, however, this will be a point in time within the symbol or chip period and thus a point in time that occurs in a plurality or in all of the symbol or chip periods. In general, it can therefore be a repeating point in time, in particular measured in relation to a clock cycle or clock period, for example measured against a clock or a clock generator of the transmission system, in particular modulo the symbol or chip period. An absolute point in time can thus also be selected as the point in time of the earliest of the second plurality of sampling values, but it is advantageously the point in time of the earliest of the second plurality of sampling values in the signal and/or chip period. As a result, it is possible to increase the accuracy by aggregating several sampling values at symbols and/or chips transmitted at different absolute times.

According to the invention, the second plurality of sampling values of the third plurality of the transmitted symbols and/or chips is chosen so that they are taken on symbols and/or chips transmitted at different times and are situated on at least five, in particular at least ten, different first points in time in the symbol and/or chip period which are offset by at least two percent of the symbol and/or chip period and/or which are framing at least ten, in particular at least 20, percent of the first points in time in the symbol and/or chip period, in which the interval in the symbol and/or chip period of the first points in time as relates to one another is in particular less than the smallest possible sampling interval of the second object of the transmission system.

The points in time at which the sampling values are recorded are therefore, in particular, configured in such a way that they are recorded on different symbols or chips, for example in different symbol and/or chip periods. In addition, together they span at least ten percent of the symbol and/or chip period.

In particular, the second plurality of sampling values is processed in such a way that they are aggregated when considered in terms of time modulo the symbol or chip period, and/or are considered aggregated in terms of their position within the symbol or chip period considered in terms of time. This allows measurements to be considered jointly on several symbols and/or chips, which increases the accuracy, assuming constant transmission conditions. In particular, such respective sampling values are jointly considered and/or aggregated which have been recorded at least at the transmitter and/or theoretically identical signal edges or signal changes, in particular at edges between two different symbols and/or chips, with the different symbols and/or chips and in particular the sequence thereof, between which the edges at which the sampling values jointly considered and/or aggregated lie, in particular being identical.

In particular, recorded sampling values are divided into groups, with each group being assigned to a sequence of two different successive symbols and/or chips. In particular, at least 10, in particular at least 100, sampling values are recorded for/in at least one or each group. In particular, at least 10 sampling values are recorded and/or classified for at least 10 points in time in the symbol or chip period.

The object is also achieved by means of a transmission system set up for carrying out a method according to the invention.

The object is also achieved by means of a method for securing an access system having an authorization means and an access control means, in which, between the authorization means and the access control means, at least one first plurality of symbols and/or chips is transmitted electrically, magnetically, or electromagnetically from a first of the two means which are authorization means and access control means to a second of the two means which are authorization means and access control means, at a first symbol or chip rate, encoded in at least one first analog signal, and/or is transmitted from a first of the two means which are authorization means and access control means to a second of the two means which are authorization means and access control means and/or in at least one second analog signal generated based on the first analog signal by means of a transmission system, in which the time of the earliest reception of a signal change and/or a signal edge is determined by means of a method or system according to the invention and, when a predetermined time deviation of a time of a data reception from the time of the earliest reception is exceeded, and/or if the earliest reception deviates from a predetermined timespan or a timespan calculated using other methods, the access, entry, activation, deactivation, and/or opening is denied by the access control means, and/or a signal propagation time and/or signal round-trip time and/or a distance is determined based on the time of the earliest reception, and if a predetermined signal propagation time and/or signal round-trip time and/or distance exceeds a predetermined signal propagation time and/or signal round-trip time and/or a predetermined distance and/or a predetermined deviation from the signal propagation time and/or signal round-trip time and/or distance determined in another way or by means of another method, access, entry, activation, deactivation, and/or opening, in particular by the access control means, is denied.

Data reception is, in particular, the reception of a signal component that is used by the transmission system, in particular also without the method according to the invention, in order to detect, derive, and/or decode information, a data packet, or bit, the signal component in particular having no components which the transmission system does not use to detect, derive, and/or decode a data packet or bit, particularly also without the method according to the invention. This can be, for example, a constant signal state, such as a constant voltage, as is common, for example, for coding a 0 or 1, but also an edge from which a bit is derived. A point in time of data reception is, in particular, the start of reception of a signal component that is used by the transmission system, in particular also without the method according to the invention, in order to detect, derive, and/or decode information, a data packet, or bit, the signal component in particular having no components which the transmission system does not use to detect, derive, and/or decode a data packet or bit, particularly also without the method according to the invention.

The methods, systems, and uses according to the invention also enable signals or signal changes that are 10 dB or less, in particular 20 dB or less, or even 30 dB or less than the signal components that are used by the transmission system without the method according to the invention in order to detect, derive, and/or decode information, a data packet, or bit.

As a result, signal components with only a relatively small signal component, for example one with an amplitude and/or change which is by 10 dB or more, in particular 20 dB or more, in particular 30 dB or more, less than the maximum amplitude and/or change in the received and/or the transmitted signal, can be detected, in particular as the point in time of the earliest reception, and/or particularly if they are at an interval of at least ⅛, particularly at least 1/20, particularly at least 1/80, particularly at least 1/250, of the signal rate from the maximum and/or larger amplitude and/or change in the received signal, particularly if the second and/or the fourth plurality is greater than or equal to 400 and/or the second plurality was recorded on at least 400, in particular directly consecutive, edges and/or signal changes. The methods, systems, and uses are advantageously designed accordingly. This can be implemented in particular in an existing transmission system and with existing hardware.

The accuracy of the time measurement, signal propagation time measurement, signal round-trip time measurement, and/or time synchronization can also be improved to ⅛, particularly 1/20, particularly 1/80 of the symbol rate of the transmission system in the methods, systems, and uses according to the invention, particularly if the second and/or the fourth plurality is greater than or equal to 400 and/or the second plurality was recorded in at least 400, in particular directly consecutive, edges and/or signal changes. The accuracy of the time measurement, signal propagation time measurement, signal round-trip time measurement, and/or time synchronization can also be improved to 1/25, particularly 1/60, particularly 1/250 of the symbol rate of the transmission system in the methods, systems, and uses according to the invention, particularly if the second and/or the fourth plurality is greater than or equal to 4000 and/or the second plurality was recorded on at least 4000, in particular directly consecutive, edges and/or signal changes. The methods, systems, and uses are advantageously designed accordingly. This can be implemented in particular in an existing transmission system and with existing hardware. A method for improving a transmission system in order to implement a method according to the invention or to create a system according to the invention thus also represents a subject matter of the invention.

The object is also achieved by means of an access control system having an authorization means and an access control means, in which the access control system has a transmission system configured between the authorization means and the access control means to transfer at least one first plurality of symbols and/or chips electrically, magnetically, or electromagnetically from a first of the authorization means and access control means to a second of the authorization means and access control means, at a first symbol or chip rate, encoded in at least one first analog signal, and/or to transfer from a first of the two means which are authorization means and access control means to a second of the two means which are authorization means and access control means, encoded in at least one second analog signal generated based on the first analog signal, in which the access control system is configured to determine a point in time of the earliest reception of a signal change and/or a signal edge by means of one of the previous methods and, when a predetermined time deviation of a time of a data reception from the time of the earliest reception is exceeded, and/or if the earliest reception deviates from a predetermined timespan or a timespan calculated using other methods, to deny access, entry, activation, deactivation, and/or opening, particularly by the access control means, and/or to determine a signal propagation time and/or signal round-trip time and/or a distance based on the time of the earliest reception, and if a predetermined signal propagation time and/or signal round-trip time and/or a predetermined distance is exceeded and/or if a predetermined deviation from the signal propagation time and/or signal round-trip time and/or distance determined in another way or by means of another method is exceeded, to deny access, entry, activation, deactivation, and/or opening, in particular of the access control means and/or by the access control means.

The object is also achieved by using a point in time of an earliest reception of a signal change and/or a signal edge for access control, authentication, distance measurement, synchronization, and/or for detection of and/or for defense against relay attacks, in which at least one first plurality of symbols and/or chips are transmitted from a first to a second object by means of a transmission system, at a first symbol or chip rate, encoded in at least one first analog signal, and/or are transferred from a first to a second object in at least one second analog signal, generated based on the first analog signal, and a second plurality of sampling values of the transmitted symbols and/or chips of the at least one first or second analog signal at the second object is used to detect the earliest reception of the signal change and/or the signal edge of a symbol or chip that has changed as compared to the previous symbol or chip, in which, as the time of earliest reception, the time is chosen at which the first change in the received first or second analog signal and/or an aggregated group of the received first or second analog signal is detected, which change is statistically significant and/or exceeds or falls below a value determined from a fourth plurality of sampling values of the first and/or second analog signal or goes beyond a value range determined by sampling values of the first and/or of the second analog signal, in which the second plurality of sampling values of the third plurality of the transmitted symbols and/or chips is chosen so that they are recorded on symbols and/or chips transmitted at different times and are situated on at least five, in particular at least ten, different first points in time in the symbol and/or chip period which are offset by at least two percent of the symbol and/or chip period and/or which are framing at least ten, in particular at least 20, percent of the first points in time in the symbol and/or chip period, in which the interval in the symbol and/or chip period of the points in time as relates to one another is in particular less than the smallest possible sampling interval of the second object of the transmission system.

The statements made above regarding the method for determining the time of the earliest reception apply to identical terms as well as to the method for securing an access system, the use, and/or the system.

Particularly as relates to the method, the use, and/or system, granting access, entry, activation, deactivation, and/or opening, in particular by the access control means and/or of the access control means, if there is no deviation and/or exceeding present. In particular, the access, entry, activation, deactivation, and/or opening is only granted if, with a large number of repetitions, there are no or only a predetermined number of deviation and/or exceeding instances present or if no or a maximum of a predetermined number of deviation and/or exceeding instances are present.

In particular, access, entry, activation, deactivation, and/or opening is only granted if at least one further authentication requirement is met, for example a correct password is entered or the certificate is valid and/or is marked as permitted in the access system. It is particularly advantageous if the at least one authentication request contains a large number of authentication requests that depend on the time of reception, in particular according to this application and/or at least one authentication request that is independent of the time of reception. The temporal validity of a certificate, which may depend on the time, but not directly on the time of reception itself, is also independent of the time of reception.

In particular, access is not just access to an area, in the sense of the possible movement of an object and/or a person into this area, for example the interior of a room or a vehicle, but in particular also the access to a function, in particular also in the sense of activating a function, such as access to the function of starting a vehicle or access to the "dispensing coffee" function of a coffee machine. Accordingly, access control systems are in particular not just those that only control, restrict, and/or protect access to an area, in the sense of the possible movement of an object and/or a person into this area, but in particular those that control, restrict, and/or protect access to a function, in particular in the sense of activating a function.

Relevant access control systems include, in particular, authorization systems, for example for logging into a computer system, for example by means of a password and/or certificate, or classic access control systems such as locks, barriers, doors, and/or gates and/or activation of functions, for example a service station, such as a coffee machine. In particular, these can be doors and/or ignition locks and/or the starter of a vehicle (e.g. motor vehicle, airplane, ship, or autonomous taxi—as well as all other conceivable vehicles). This may also relate to an access to and/or activation of any service point (ATM, telephone, coffee machine—the list can be expanded as needed). Mobile phones, keys, certificates, and/or input systems for entering passwords can be used as the authorization means.

In particular, the transmission system of the method, the use, and/or of the system is a wireless one, for example one used for communication between remote control keys or near field keys, in particular for motor vehicles, and for example a motor vehicle or two Bluetooth modules.

In particular, with regard to the method, the use, and/or the system, the signal change is only detected and/or accepted as such and/or the access, entry, activation, deactivation, and/or opening only granted and/or a signal change according to the invention is only present if it is an expected and/or predetermined and/or agreed signal change and/or if the signal change encodes information, particularly exchanged between the first and second object, in particular transmitter and receiver, based on symbols and/or chips and/or signals if the signal change encodes a predetermined unit of information calculable based on symbols and/or chips exchanged between the first and second object, in particular transmitter and receiver, and/or if the signal change has a shape and/or type based on symbols and/or chips exchanged between the first and second object, in particular the transmitter and receiver, and/or if the signal change has a predetermined and/or calculable shape and/or type, calculable based on symbols and/or chips exchanged between the first and second object, in particular the transmitter and receiver.

In this case, the information, type, and/or shape does not have to be predetermined and/or calculable as and/or by means of precisely defined information, type, and/or shape, but predetermined tolerances and/or predetermined deviations from the predetermined and/or calculated information, type, and/or shape are permitted. This makes it possible to achieve further security because an attacker would also have to know the type of signal change, the predetermined and/or calculated shape and/or the predetermined and/or calculated information. A unit of information can also be and/or become predetermined and/or calculated through the preceding communication and/or transmission. A particularly simple type of a predetermined and/or calculated shape can be, for example, the type of edge, characterized as a falling or rising edge. Even if this simple type only offers a comparatively low level of protection when used once, the level of protection increases significantly when the method is used multiple times. The predetermination and/or calculation of the shape is preferably as a rising or falling edge and/or the encoded predetermined and/or calculated information is preferably as 0 or 1. In particular, access, entry, activation, deactivation, and/or opening is only granted if, in particular in addition to at least one other authentication requirement, a large number of authentication requirements, which depend on the time of reception, are met, in particular according to this application, in particular claim 1 thereof.

In particular, a plurality of times of the earliest reception of a plurality of signal changes and/or a plurality of signal edges is determined by means of one of the above methods and, when a predetermined number of exceeding instances of a predetermined and/or calculated deviation of the respective reception from a respectively predetermined and/or calculated timespan or a timespan calculated with other methods is exceeded, the access, entry, activation, and/or opening is denied by the access control means.

The method, the use, and/or the system can ensure, for example, with high accuracy that access is only granted if the authorization means is within a specified distance or volume and/or spatial range and/or to ensure that there is no relay attack. It is particularly advantageous that this is possible in many modern systems without changing the hardware.

The sampling values at the second object of a fifth plurality of the transmitted symbols and/or chips of the at least one first or second analog signal are used, as the fourth plurality of sampling values, in particular to determine the level of significance and/or to determine the specific value or range of values, in particular from the standard deviation or the width of the fluctuation or dispersion of the fourth plurality of sampling values.

A statistically significant change is assumed, in particular, if the change reaches or exceeds x times the standard deviation of the fourth plurality of sampling values or where the determined value is a mean value or median from the fourth plurality of sampling values plus or minus x times the width the fluctuation within or the dispersion of the fourth plurality of sampling values or where the determined value range extends over twice the x times the width of the fluctuation or dispersion of the fourth plurality of sampling values, in particular by an aggregated value, in particular, for example, arithmetic, mean value, or median, from the fourth plurality of sampling values, or where the determined value is x times the width of the fluctuation or dispersion plus, for example, an arithmetic, mean value, or median, from the fourth plurality of sampling values.

Advantageously, x is in the range from 0.4 to 5, in particular from 0.5 to 3, in particular between 1 and 3.

In particular, the harmonic, cubic, geometric, quadratic, or preferably arithmetic mean, the median, or the mode is used as the mean value.

In particular, the empirical standard deviation of the deviation of the set of values from its mean is used as the standard deviation of a set of values. In particular, the standard deviation mathematically represents the mean deviation of the values from the mean.

The sampling values at the second object of a fifth plurality of the transmitted symbols and/or chips of the at least one first or second analog signal are advantageously used as the fourth plurality of sampling values, and the fourth plurality of sampling values of the fifth plurality of the transmitted symbols and/or chips is chosen such that they are recorded on symbols and/or chips transmitted at different times and are situated on at least five, in particular at least ten, different second points in time in the symbol and/or chip period which are offset by at least two percent of the symbol and/or chip period and/or which are framing at least ten, in particular at least 20, percent of the second points in time in the symbol and/or chip period.

As a result, a particularly dynamic adaptation of the threshold for detecting the earliest point in time can be achieved from the signal itself, and the accuracy can be increased, in particular under changing transmission conditions.

With further advantage, the interval in the symbol and/or chip period of the second points in time as relates to one another is in particular less than the smallest possible sampling interval of the second object of the transmission system, in particular smaller by at least a factor of two. This allows the capabilities of the hardware used to be optimally exploited.

The fourth plurality of sampling values of the fifth plurality of the transmitted symbols and/or chips is advantageously in a section of the symbol and/or chip period in or at which the at least one first and/or second analog signal is constant and/or has a constant level, at least at the transmitter and/or theoretically considered at the receiver under optimal transmission conditions. This enables a particularly high level of accuracy to be achieved. The knowledge of when this condition is present can be derived relative to the symbol and signal period, in particular with knowledge of the specification of the transmission system and/or derived at least approximately from the course of the signal itself.

It should be noted that a point in time in the symbol and/or chip period on the receiver and/or a section in the symbol and/or chip period on the receiver is on an absolute clock at a different time than the same point in time in the symbol and/or chip period on the transmitter and/or a section in the symbol and/or chip period on the transmitter, namely offset by the signal propagation time from the transmitter to the receiver.

In order to determine the change, the level of significance, the width of the fluctuation or dispersion and/or of the predetermined value and/or value range, at least one property of the first or second signal, for example the level and/or the amplitude and/or the phase of the first or second signal is advantageously used and/or at least the change in the at least one property of the received first or second analog signal is used as a change in the received first or second analog signal. The time of the earliest sampling value or of the aggregated group can be used as the time of the earliest reception, which time exceeds or falls below the determined value related to at least one and/or all of the at least one property or that goes beyond the value range determined from the fourth plurality of sampling values of the first and/or second analog signal.

For example, only the phase of the sampling values can be used and/or only the amplitude thereof. It is also possible to take both into account and to use the time of the earliest sampling value which meets one or both criteria as the time of the earliest reception, for example which exceeds or falls below a range of values with regard to the amplitude and/or goes beyond a range of values with regard to the amplitude.

The level and/or the amplitude and/or the phase are common and proven properties of the signal, symbols and/or chips being encoded during the signal change, for example using amplitude shift keying (ASK) or phase shift keying (PSK), such as multiple phase shift keying (MPSK), Gaussian frequency shift keying (GFSK), or quadrature amplitude modulation (QAM). The method according to the invention can be implemented particularly easily and reliably with first and/or second signals modulated with these or according to these methods and/or in transmission systems that use such a modulation or in devices that use such a modulation.

The second analog signal is advantageously mixed by means of mixing and/or generated with a high frequency from the first signal and/or the second signal is higher in frequency than the first and/or the first signal is reconstructed at the second object to the extent possible, in particular by mixing, from the second signal at the second object before the sampling.

The second plurality is advantageously equal to the fourth plurality, and/or the third plurality of the transmitted symbols and/or chips is equal to the fifth plurality of transmitted symbols and/or chips. This does not mean that the sampling values are the same, but rather only relates to the number of sampling values in the pluralities, which are advantageously chosen to be identical.

The first points in time and second points in time are advantageously selected in such a way that the first points in time are in a first timespan of the symbol and/or chip period and the second points in time are in a second timespan of the symbol and/or chip period and the first and second timespans do not overlap in the symbol and/or chip period.

The transmission system is advantageously bidirectional. In this case, useful data can be transmitted in both directions or useful information can only be transmitted in one direction and at least control data, such as channel quality indicator (CQI) or acknowledgment (ACK) signals, can be transmitted in the other direction. A method according to the invention or a use according to the invention is applied to both transmission directions with particular advantage. With regard to a direction of transmission, the first object is the transmitter and the second object is the receiver, and the roles and/or numbering of the objects are reversed in relation to the opposite direction. In particular, in such an embodiment, a signal round-trip time, in particular from the first to the second object and back or vice-versa, is determined based on at least one earliest point in time at the first object and on at least one earliest point in time at the second object. In particular, the signal round-trip time is used to determine a distance between the first and the second object.

The symbols and/or chips transmit, with particular advantage, at least partially encrypted information, in particular at least partially encrypted information about the course of the first and/or second analog signal and/or such information that enables conclusions to be drawn about the course of the first and/or second analog signal, the type, and/or the shape of at least one edge and in which such conclusions are drawn and used at the second object, for example to select one or more of the pluralities and/or to define one or more timespans, sections, and/or points in time. The symbols and/or chips transmit, with particular advantage, at least partially encrypted information, in particular at least partially encrypted authorization information, such as a password or certificate. Such configurations can further increase the security against attacks.

With regard to the method, the use, and/or the system, the signal change is only detected and/or accepted as such with advantage and/or the access, entry, activation, deactivation, and/or opening are only granted and/or a signal change according to the invention is only present,

- if it is a signal change previously agreed-upon in encrypted form or communicated in encrypted form and/or
- if the signal change encodes information based on data exchanged in encrypted form between the first and second object, in particular the transmitter and receiver and/or
- if the signal change encodes information that can be calculated using data exchanged in encrypted form between the first and second object, in particular the transmitter and receiver and/or
- if the signal change has a shape and/or manner based on data exchanged in encrypted form between the first and second object, in particular the transmitter and receiver and/or
- if the signal change has a shape and/or manner calculable using data exchanged in encrypted form between the first and second object, in particular the transmitter and receiver.

Advantageously, the second and/or fourth sampling values are equidistant in the symbol and/or chip period and/or the second and/or fourth sampling values are equidistant over time, in which particularly their spacing over time is chosen such that their position in the symbol and/or chip period repeats after five symbols and/or chips at the earliest, in particular after ten symbols at the earliest.

With particular advantage, the symbol and/or chip period is defined in at least three non-overlapping time ranges and/or at least two, in particular three, non-overlapping time ranges are defined in the symbol and/or chip period, in which the first points in time are in a first of the three ranges and the second points in time are in a second of the three ranges, in which the first and the second range in particular are adjacent to one another and/or the third range is not between the first and second.

This makes it possible to further improve the accuracy of the method in the event of imprecise synchronization and/or differing environmental conditions. For example, it can be ensured that the fourth plurality of sampling values of a fifth plurality of the transmitted symbols and/or chips of the at least one first or second analog signal are recorded at the second object in a range of the symbol and/or chip transmission period in which, in particular, taking into account inaccuracies to be expected, a signal that is as constant as possible can be expected and/or in which there is no edge and/or no settling process and/or there is no transition generated by Gaussian frequency shift keying (GFSK) and/or at which, for example at the first object, a constant first and/or second signal is emitted.

With particular advantage, the synchronization accuracy in the transmission system between the first and second object, in particular without the use of the method according to the invention, is selected such that the deviation, in particular of the clocks, clock generators, and/or time measurements, between the first and second object amounts to a maximum of 50% of the symbol and/or chip period, in particular is in the range from 10 to 50% the symbol and/or chip period.

With particular advantage, the sampling values are recorded after signal processing, for example by mixing, rectifying, and/or smoothing.

With particular advantage, the detection of the earliest point in time at the second object can be used to transmit a signal from the second object, in particular with a predetermined and/or communicated temporal correlation to the earliest point in time. In particular, the detection of the earliest point in time at the second object can be used to carry out the method according to the invention a second time, in which the first and second objects are reversed and in which particularly the earliest point in time and/or its temporal position is communicated relative to the time of a clock or a timer of the transmission system, in particular communicated to the first object and/or with the first analog signal of the second implementation and/or to the second object in the second implementation of the method and/or in which the analog signal of the second implementation has a predetermined and/or communicated relationship as relates to the earliest time it was first executed.

Advantageously, the earliest reception of a signal change at a plurality of antennas that are spatially distant from one another, in particular with a distance of at least 0.5 m between two antennas, positioned in a fixed arrangement can be determined, and from this the direction of arrival of the signal change can be determined. The direction of arrival can advantageously be used for authentication and/or can represent an authentication requirement. The antennas are advantageously arranged on a vehicle, its opening or activation and/or operation being secured and/or limited by a method, system according to the invention and/or a use according to the invention.

For example, the plurality of antennas can be arranged in a motor vehicle and the determined direction of arrival can be determined relative to the orientation of the vehicle. For example, starting the vehicle can only be allowed if the direction of arrival is one that is within a predetermined angular range for the forward travel direction of the vehicle, in particular one that indicates the position of the transmitter behind the wheel in the forward travel direction of the vehicle and/or requires the position of the transmitter within the vehicle together with the distance.

The transmission system and/or the first and/or the second signal is advantageously such as specified herein, and the received signal is sampled with a significantly higher bandwidth, in particular at least 1.5 times the bandwidth, than the specified bandwidth of the received signal, and the bandwidth of the signal detected in the sampling is used to authenticate in the way that access, entry, activation, deactivation, and/or opening is denied when a predetermined bandwidth is exceeded.

The system is advantageously configured for carrying out one or more advantageous processes and/or uses. In particular, the system is a hardware and software system, having at least one transmitter and one receiver and, in particular, at least one analog-to-digital converter for generating the sampling values on each object and/or a digital-to-analog converter for generating the first and/or second signal, and in particular at each of the objects and/or at least one CPU, in particular on each of the objects. In particular, the method and/or the use utilizes such a hardware and software system. In particular, the software is configured to control the hardware for carrying out a method according to the invention and/or a use according to the invention.

A multiple transmission or a multiple implementation of transmissions of at least one first plurality of symbols and/or chips takes place with particular advantage, at a first symbol or chip rate, from a first to a second object encoded in at least one first analog signal (NF) and/or in particular from a first to a second object, encoded in at least one second analog signal (HF) generated on the basis of the first analog signal.

A transmission or a multiple implementation of transmissions of at least one first plurality of symbols and/or chips takes place with particular advantage, at a first symbol or chip rate, in several first or second analog signals and at least one first plurality of symbols and/or chips is encoded therein in each case, at a first symbol or chip rate, in particular from a first to a second object.

It is particularly advantageous that a plurality of receiving devices are locally fixedly connected to the second object but at a distance from it, in particular at least 10 cm apart, and/or a time of the earliest reception of a signal change and/or a signal edge is determined with respect to each of the several receiving devices of the second object. In particular, the second object and the several receiving devices are part of a motor vehicle and/or the first object is an access means, in particular a wireless key. In particular, on the basis of the third plurality of transmitted symbols and/or chips, used at the second object, of the at least first or second signal, a direction and/or a distance in which the first object is located is determined, in particular by triangulation, in particular based on the differences in the times of the earliest reception at the several receiving devices of the second object. In particular, the determined distance(s) is and/or are checked for consistency with the times of the earliest reception. In particular, an angle and/or an angular difference between the first and second object and/or one of the several receiving devices and/or between the first object and one of the several first receiving devices is determined on the basis of the third plurality, of the transmitted symbols and/or chips of the at least first or second signal, which is used at the second object, particularly due to phase comparison of the third plurality of the transmitted symbols and/or chips of the at least first or second signal.

It is particularly advantageous that several transmission devices of the first object are provided and used for transmission, connected to the first object in a locally fixed manner but at a distance from it, in particular at least 10 cm away, and/or several first objects are arranged locally fixedly connected to the first object but spaced apart from it, in particular at least 10 cm apart, and the method according to the invention is carried out with respect to each of the several first objects and in particular is determined from the third plurality of transmitted symbols and/or chips, of the at least first or second signal, which are used at the second object, a time of the earliest reception of a signal change and/or a signal edge is determined for each first object and/or each transmitting device.

A distance and/or orientation change between the first and second object is determined advantageously based on the phase change between the third plurality of transmitted symbols and/or chips, of the at least first or second signal, which are used at the second object, and/or it is determined therefrom the length by which at least two signal paths of the third plurality of transmitted symbols and/or chips, of the at least first or second signal, differ based on the differences in the times of the earliest reception, in particular assuming a static arrangement and surroundings of the first and second object during the transmission of the first or second signals.

In particular, the shortest signal path and/or signal component that was received via the shortest signal path is determined.

In particular, on the basis of the third plurality of transmitted symbols and/or chips, used at the second object, of the at least first or second signal of the several first objects and/or transmitting devices, a direction and/or a distance in which the first object is located is determined, in particular by triangulation, in particular based on the differences in the times of the earliest reception of signals from the first objects and/or transmitting devices of the first object. In particular, the determined distance(s) is and/or are checked for consistency with the times of the earliest reception.

With particular advantage, an incidence angle difference between the first and second object is determined based on the phase change between the third plurality of transmitted symbols and/or chips, of the at least first or second signal, which are used at the second object, and/or it is determined therefrom the angle by which at least two signal paths of the third plurality of transmitted symbols and/or chips, of the at least first or second signal, differ, in particular assuming a static arrangement and surroundings of the first and second object and/or the receiving devices and of the second object during the transmission of the first and the first further signals.

Due to the phase change between a received second signal and a plurality of received second further signals, an angle of incidence difference between the first and second object is particularly advantageously determined and/or it is used to determine the angle by which at least two signal paths of the second and the second further signals differ, in particular assuming a static arrangement and surroundings of the first and second object and/or of the receiving devices and that of the first and/or second object during the transmission of the second and the second further signals.

BRIEF DESCRIPTION OF THE DRAWINGS

Further advantageous embodiments and advantages are to be explained further, purely by way of example and not in a limiting manner, using the following figures. The following is shown.

DETAILED DESCRIPTION

Figure 1:
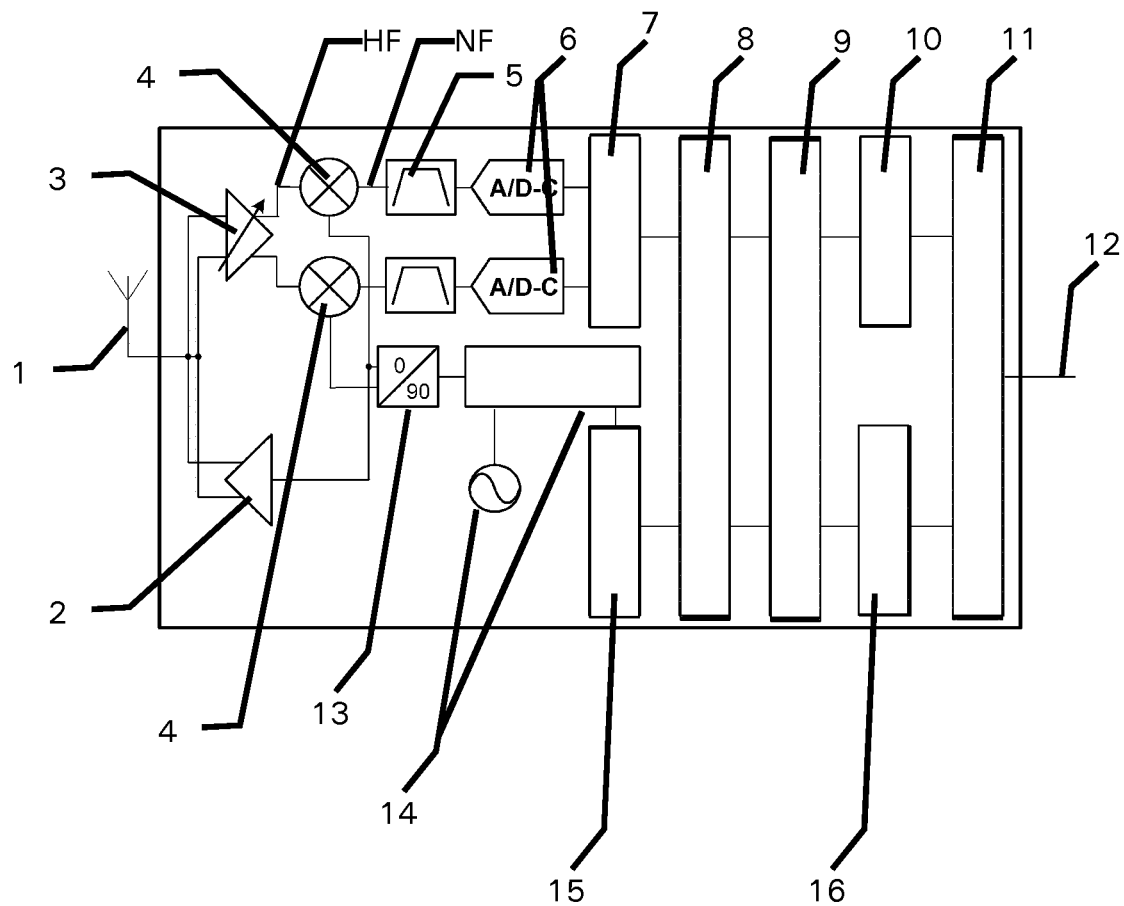
FIG. 1: a schematic representation of a transmitting and receiving module from the prior art

FIG. 1 shows a schematic structure of a transmitting and receiving module from the prior art. Such a module is provided, for example, by the CC25 chip from Texas Instruments. Such a transmitting and receiving module is suitable for transmitting data, by means of an I/Q method, for example using the Bluetooth standard.

An antenna 1 connected externally to the chip is shown. The signals received by the antenna are routed through the input amplifier 3 and then split into two signals. These are fed to two mixers 4 and then each routed to an analog-to-digital converter 6 via a bandpass filter 5. In addition, a signal generated in the frequency synthesizer 14 is fed to one of the mixers 4, while the signal from the frequency synthesizer 14 is only fed to the other mixer 4 after it has passed a phase shifter 13. The I/Q signals can thus be obtained from the mixers 4. After the analog-to-digital converter 6, the I/Q signals are then routed in digital form to the demodulator 7 and then transferred to a packet handler 9 and the input memory 10 via an error correction and decoding unit 8. From there, they arrive at an interface driver 11 through which the data are then made available via the input 12, for example for further processing by means of a CPU.

Data that are to be sent can be transferred to the interface driver 11 via the input 12 and are then written in an output memory 16 and transferred to the error correction and coding unit 8 via the packet handler 9. The signals generated in this way are then transferred to the transmitter amplifier 2 and the antenna 1 by means of a modulator 15 and the frequency synthesizer 14.

If such a module is to be used for a method, use, or system according to the invention, further sampling values of the analog-to-digital converter 6 would have to be tapped, in addition to the received data usually provided via the input 12; although these values are usually collected in the analog-to-digital converter 6, they are typically only used in the immediately following stages for decoding or recovery of the digital data stream from the first and/or second signal but then not passed on or further used, for example not derived from the chip used, for example via input 12 in this case.

The sampling values could in principle also be provided via input 12, which could be possible by changing the firmware. But other data inputs and/or outputs are also conceivable. In principle, however, the hardware included, together with a CPU and corresponding software, in particular in a memory, is sufficient for implementing the method according to the invention or for forming an object of a system according to the invention.

Figure 2:
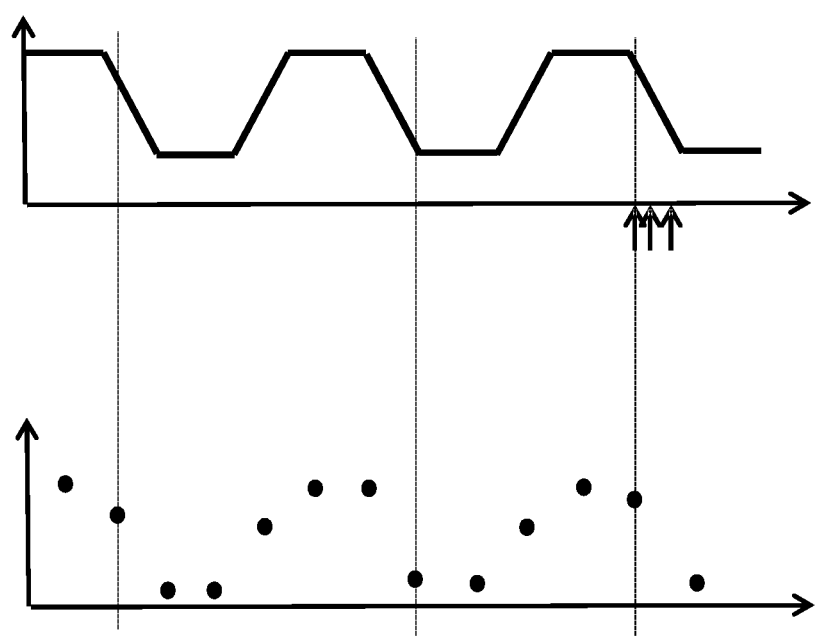
FIG. 2: an illustration of the aggregation of measured values from different symbol periods

In the upper part, FIG. 2 shows a signal of a digital data transmission system which changes between two states, for example 0 and 1, in an alternating manner, with edges in between. In the lower part, measured values (sampling values) of the upper signal are shown as thick dots. At the measuring points on a falling edge, dashed lines are drawn into the upper part to clarify the position in the upper signal. The position of the sampling values or measurement points, recorded on the successive falling edges, in the symbol or chip period is illustrated by three arrows in the upper part. It can be seen that the time-shifted sampling of the signal at different points in time of the symbol or chip period with respect to the three falling edges, for example, enables the repeating falling edge to be recorded with a very high temporal resolution.

Figure 3:
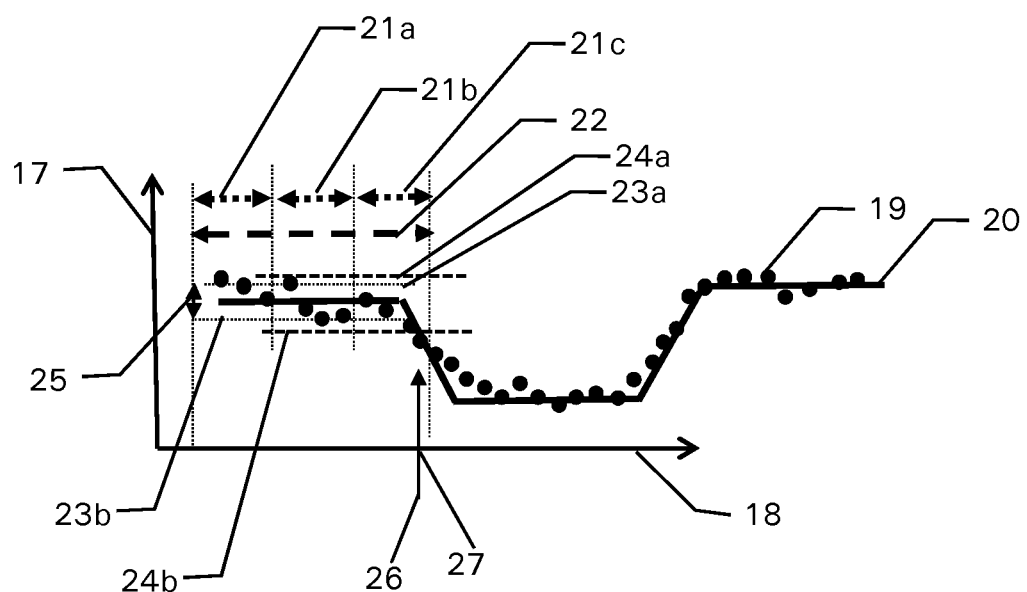
FIG. 3: an illustration of the method according to the invention

FIG. 3 shows an illustration of the method according to the invention. A diagram with amplitude axis 17 and time axis 18 of the receiver shows the transmission signal 20, which is time-shifted by the signal propagation time from the transmitter to the receiver, and aggregated sampling values 19 of the received signal at the receiver. The points each represent aggregated sampling values 19 recorded at ten symbols transmitted at different times at approximately identical times in the symbol period. The size of the circle symbolizes the inaccuracy of the aggregated sampling values in terms of time and amplitude.

The symbol period 22 and the division of this into three ranges 21a, 21b, 21c is shown. Also shown is the limit of the width of the fluctuation 23a, 23b of the mean values of the sampling values in the second range 21b and the limits 24a, 24b of the range of values resulting from multiplication by the factor x from the width of the fluctuation about the arithmetic mean of the aggregated sampling values in the second range 21b. The first aggregated sampling value 26, which exceeds or falls below the limit of the value range 24a, 24b, can also be seen. This defines the earliest point in time 27 of the received signal change.

LIST OF REFERENCE NUMERALS

1 Antenna
2 Transmission amplifier
3 Input amplifier
NF Low-frequency signal
4 Mixer
HF High-frequency signal
5 Bandpass filter
6 Analog-to-digital converter
7 Demodulator
8 Error correction and encoders and decoders
9 Packet handler
10 Input, FiFo memory
11 Interface driver
12 Input
13 Phase shifter
14 Frequency synthesizer
15 Modulator
16 Output, FiFo memory
17 Amplitude axis
18 Time axis
19 Aggregated sampling values
20 Signal at the transmitter, delayed by the signal propagation time
21a First range of the symbol period
21b Second range of the symbol period
21c Third range of the symbol period
22 Symbol period
23a Upper limit of the fluctuation of the mean values
23b Lower limit of the fluctuation of the mean values
24a Upper limit of the value range
24b Lower limit of the value range
25 Width of the fluctuation of the mean values
26 First value that falls below the lower limit
27 Earliest point in time

The invention claimed is:

1. A method for determining a point in time of an earliest reception of a signal change or a signal edge, for measuring a propagation time, for measuring distance or for synchronization, in a symbol-synchronized or digital transmission system comprising:
  transmitting via the transmission system at least one first plurality of symbols or chips from a first object to a second object at a first symbol or chip rate, encoded in at least one first analog signal (NF), or is transmitted from the first object to the second object in at least one second analog signal (HF) generated based on the at least one first analog signal; and
  using a second plurality of sampling values of a third plurality of the transmitted symbols or chips of the at least one first analog signal or second analog signal at the second object to detect the earliest reception of the signal change or the signal edge of a symbol or chip that deviates from a preceding symbol or chip;
  wherein the second plurality of sampling values of the third plurality of the transmitted symbols or chips is recorded on symbols or chips transmitted at different times and are situated on at least five different first points in time in the symbol or chip period which are offset by at least two percent of the symbol or chip period or which are framing at least ten percent of the first points in time in the symbol or chip period, wherein an interval in the symbol or chip period of the first points in time as relates to one another is less than a smallest possible sampling interval of the second object of the transmission system; and wherein a time of the earliest reception is defined as the time at which, in a signal or chip period, an earliest of the second plurality of sampling values or an earliest aggregated group of the second plurality of sampling values shows a statistically significant change, in the signal or chip period, or the time at which the earliest of the second plurality of sampling values or the earliest aggregated group of the second plurality of sampling values exceeds or falls below a value determined from a fourth plurality of sampling values of the at least one first analog signal or second analog signal, or the time at which the earliest of the second plurality of sampling values or the earliest aggregated group of the second plurality of sampling values goes beyond a value range determined from the fourth plurality of sampling values of the at least one first analog signal or second analog signal.

2. The method according to claim 1, wherein sampling values at the second object of a fifth plurality of the transmitted symbols or chips of the at least one first analog signal or second analog signal are used as the fourth plurality of sampling values.

3. The method according to claim 2, wherein the fourth plurality of sampling values of the fifth plurality of the transmitted symbols or chips lie in a section of the symbol or chip period at which the at least one first analog signal or second analog signal is constant or has a constant level.

4. The method according to claim 2, wherein a level or an amplitude or a phase of the at least one first analog or second analog signal is used to determine the change, the level of significance, the width of the fluctuation or dispersion or of the predetermined value or value range, or the change in the level or the amplitude or the phase of the received at least one first analog or second analog signal is used for change in the received at least one first analog or second analog signal or the sampling values thereof.

5. The method according to claim 2, wherein the second plurality of sampling values is equal to the fourth plurality of transmitted symbols or chips, or the third plurality of transmitted symbols or chips is equal to the fifth plurality of symbols transmitted or chips; or wherein the first points in time and second points in time are chosen so that the first points in time lie in a first timespan and the second points in time lie in a second timespan of the symbol or chip period, and the first and second timespans do not overlap.

6. The method according to claim 2, wherein the sampling values at the second object of a fifth plurality of the transmitted symbols or chips of the at least one first analog signal or second analog signal are used as the fourth plurality of sampling values to determine the level of significance or to determine the specific value or range of values.

7. The method according to claim 6, wherein the level of significance, the specific value or range of values is determined from a standard deviation or a width of a fluctuation within a dispersion, or dispersion of the fluctuation of the fourth plurality of sampling values.

8. The method according to claim 1, wherein the second analog signal is generated by mixing the second analog signal with a high frequency from the first signal or the second signal is higher in frequency than the first signal or wherein the first analog signal is reconstructed, to the extent possible, at the second object from the second signal at the second object before the sampling.

9. The method according to claim 1, wherein the transmission system is bidirectional and, the method is applied to both transmission directions.

10. The method according to claim 1, wherein the symbols or chips transmit at least partially encrypted information.

11. The method according to claim 1, wherein the second plurality or the fourth plurality of sampling values are equidistant in the symbol or chip period or wherein the second plurality or the fourth plurality of sampling values are equidistant over time, wherein their spacing over time is such that their position in the symbol or chip period repeats after five symbols or chips at the earliest or wherein the symbol or chip period is divided into at least three non-overlapping time ranges, wherein the first points in time are in a first of the at least three non-overlapping time ranges and the second points in time are in a second of the at least three non-overlapping time ranges.

12. The method according to claim 1, wherein the synchronization accuracy in the transmission system between the first and second object is selected such that the deviation of the clocks, clock generators, or time measurements, between the first and second object is equal to or less than 50% of the symbol or chip period.

13. The method according to claim 1, used for detection of or defense against relay attacks based on the detected earliest reception, wherein a relay attack is detected, measures to defend against the attack are initiated, or an instruction or authentication is not being executed or is not being recognized as valid a. in case of a time difference between a point in time of data reception and the point in time of the earliest reception determined based on the earliest reception detected exceeding a predetermined time difference or in case of the earliest reception deviating from a predetermined timespan or a timespan calculated using other methods; or b. in case of a signal propagation time or signal round-trip time or distance determined on the basis of the time of the earliest reception exceeding a predetermined propagation time or a predetermined signal round-time or a predetermined distance or a propagation time or a signal round-time or a distance calculated using other methods; or c. in case of a predetermined deviation of the signal propagation time or signal round-trip time or distance from a predetermined propagation time or the predetermined signal round-time or the predetermined distance calculated using another method is exceeded.

14. The method according to claim 1, wherein the statistically significant change is the change that reaches or exceeds x times the standard deviation of the fourth plurality of sampling values; or wherein the determined value is a mean value or median from the fourth plurality of sampling values plus or minus x times the width of the fluctuation or dispersion of the fourth plurality of sampling values or wherein the determined value range extends over twice the width of the fluctuation within the dispersion or dispersion of the fluctuation of the fourth plurality of sampling values, where x is between 0.4 and 5.

15. The method according to claim 1, wherein the sampling values at the second object of the fifth plurality of the transmitted symbols or chips of the at least one first analog signal or second analog signal are used as the fourth plurality of sampling values, and a chosen sampling value of the fourth plurality of sampling values of the fifth plurality of the transmitted symbols or chips are recorded on symbols or chips transmitted at different times and are situated on at least five different second points in time in the symbol or chip period or which are offset by at least two percent of the symbol or chip period or which are framing at least ten percent of the first points in time in the symbol or chip period, wherein the interval in the symbol or chip period of the second points in time as relates to one another is less than the smallest possible sampling interval of the second object of the transmission system.

16. An access control system having an authorization device and an access control device, wherein the access control system has a transmission system for communication between the authorization device and the access control device and that is configured to transfer at least one first plurality of symbols or chips electrically, magnetically, or electromagnetically from a first of the authorization device and access control device to a second of the authorization device and access control device, at a first symbol or chip rate, encoded in at least one first analog signal (NF), or to transfer from the first of the authorization device and access control device to the second of the authorization device and access control device, encoded in at least one second analog signal (HF) generated based on the first analog signal, wherein the access control system is configured to determine a point in time of an earliest reception of a signal change or a signal edge and to deny access, entry, activation, or opening, in case of a time deference between a time of a data reception and the time of the earliest reception exceeding a predetermined time difference, or in case of the earliest reception deviating from a predetermined timespan or a timespan calculated using other methods, or wherein the access control system is configured to determine a signal propagation time or signal round-trip time or a distance based on the time of the earliest reception, and to deny access, entry, activation, or opening in case of the signal propagation time or the signal round-trip time or the distance is exceeding a predetermined signal propagation time or a predetermined signal round-trip time or a predetermined distance or in case of a predetermined deviation from the signal propagation time or the signal round-trip time or the distance calculated using another method.

17. A use of a point in time of an earliest reception of a signal change or a signal edge for access control, authentication, distance measurement, synchronization, or for detection of or for defense against relay attacks, wherein at least one first plurality of symbols or chips is transmitted via a transmission system from a first object to a second object, at a first symbol or chip rate, encoded in at least one first analog signal (NF), or is transferred from the first object to the second object in at least one second analog signal (HF), generated based on the first analog signal, and wherein a second plurality of sampling values of the transmitted symbols or chips of the at least one first analog signal or second analog signal at the second object is used to detect the earliest reception of the signal change or the signal edge of a symbol or chip that has been changed as compared to the previous symbol or chip, wherein the second plurality of sampling values of the third plurality of the transmitted symbols or chips are recorded on symbols or chips transmitted at different times and situated on at least five different first points in time in the symbol or chip period which are offset by at least two percent of the symbol or chip period or which are framing at least ten percent of the first points in time in the symbol or chip period, and wherein the time of the earliest reception is defined to be the time at which the earliest, of the second plurality of sampling values or the earliest aggregated group from the second plurality of sampling values shows a statistically significant change or exceeds or falls below a value determined from a fourth plurality of sampling values of the at least one first analog signal or second analog signal or goes beyond a value range determined from the fourth plurality of sampling values of the at least one first analog signal and the second analog signal.

18. The use according to claim 17 wherein the interval in the symbol or chip period of the first points in time as relates to one another is less than the smallest possible sampling interval of the second object of the transmission system.

19. A transmission system having at least two objects, each having at least one antenna and having a total of at least one transmitter and one receiver and a computing or control unit and at least one memory and being designed to transmit a first plurality of symbols or chips, at a first symbol or chip rate, encoded in at least one first analog signal (Ne), from a first of the at least two objects to a second of the at least two objects or in at least one second analog signal (HF) generated on the basis of the first analog signal, from the first of the at least two objects to the second of the at least two objects, and designed to determine a point in time of an earliest reception of a signal change or a signal edge, for measuring the propagation time, for measuring distance or for synchronization, in a symbol-synchronized or digital transmission system; wherein the system is designed to use a second plurality of sampling values of a third plurality of the transmitted symbols or chips of the at least one first analog signal or second analog signal on the second object, in order to detect the earliest reception of the signal change or the signal edge of a symbol or chip that deviates from the preceding symbol or chip, and to record the second plurality of sampling values of the third plurality of the transmitted symbols or chips on symbols or chips transmitted at different times and situated on at least five different first points in time in the symbol or chip period which are offset by at least two percent of the symbol or chip period or which are framing at least ten percent of the first points in time in the symbol or chip period, wherein the time of the earliest reception is defined to be the time at which the earliest of the second plurality of sampling values or the earliest aggregated group from the second plurality of sampling values shows a statistically significant change, or the time at which the earliest of the second plurality of sampling values or the earliest aggregated group of the second plurality of sampling values exceeds or falls below a value determined from a fourth plurality of sampling values of the at least one first analog signal or second analog signal or which goes beyond a value range determined from the fourth plurality of sampling values of the first and of the second analog signal.

* * * * *